(12) United States Patent
Chen et al.

(10) Patent No.: US 9,614,430 B2
(45) Date of Patent: Apr. 4, 2017

(54) INVERTING APPARATUS AND AC POWER SYSTEM USING THE SAME

(71) Applicant: FSP TECHNOLOGY INC., Taoyuan (TW)

(72) Inventors: Han-Wei Chen, Taoyuan (TW); Chun-Hao Yu, Taoyuan (TW); Chia-Hua Liu, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 72 days.

(21) Appl. No.: 14/630,651

(22) Filed: Feb. 25, 2015

(65) Prior Publication Data

US 2015/0244252 A1 Aug. 27, 2015

Related U.S. Application Data

(60) Provisional application No. 61/944,587, filed on Feb. 26, 2014.

(30) Foreign Application Priority Data

Jan. 27, 2015 (CN) .......................... 2015 1 0039055

(51) Int. Cl.
  *H02M 1/32* (2007.01)
  *H02M 7/48* (2007.01)
  *H02J 3/38* (2006.01)

(52) U.S. Cl.
  CPC .............. *H02M 1/32* (2013.01); *H02M 7/48* (2013.01); *H02J 3/383* (2013.01); *Y02E 10/563* (2013.01)

(58) Field of Classification Search
  CPC .... G01R 19/2513; H02J 3/383; Y02E 10/563; H02M 1/32; H02M 7/48
  See application file for complete search history.

(56) References Cited

U.S. PATENT DOCUMENTS

| 8,611,107 | B2 * | 12/2013 | Chapman | .......... | H02M 3/33523 |
| | | | | | 323/906 |
| 8,922,185 | B2 * | 12/2014 | Ehlmann | .................. | H02J 3/385 |
| | | | | | 323/284 |
| 2010/0085035 | A1 * | 4/2010 | Fornage | ............. | G01R 19/2513 |
| | | | | | 324/76.12 |

(Continued)

*Primary Examiner* — Jessica Han
*Assistant Examiner* — Demetries A Gibson
(74) *Attorney, Agent, or Firm* — Jianq Chyun IP Office

(57) ABSTRACT

An inverting apparatus and an AC power system are provided. The inverting apparatus includes an inverting circuit, a detection circuit, and a control circuit. The inverting circuit receives a DC input voltage and converts the DC input voltage into an AC output voltage. The detection circuit samples the AC output voltage and compares the sampled AC output voltage respectively with a first reference voltage and a second reference voltage so as to generate a first indication signal and a second indication signal. The control circuit controls the operation of the inverting circuit. The control circuit determines whether the amplitude of the AC output voltage is located within an operating voltage range during each driving cycles according to the first and the second indication signals, and decides whether to enable an overvoltage protection or an undervoltage protection to control the power conversion of the inverting circuit according to the determination results.

10 Claims, 2 Drawing Sheets

(56) References Cited

U.S. PATENT DOCUMENTS

| | | | | |
|---|---|---|---|---|
| 2010/0170165 A1* | 7/2010 | Minshull | ............... | B64F 5/0009 52/127.7 |
| 2011/0305050 A1* | 12/2011 | Krein | .................... | H02J 3/1835 363/39 |
| 2013/0242616 A1* | 9/2013 | Oldenkamp | ............ | H02J 3/383 363/16 |

* cited by examiner

1

INVERTING APPARATUS AND AC POWER SYSTEM USING THE SAME

CROSS-REFERENCE TO RELATED APPLICATION

This application claims the priority benefits of U.S. provisional application Ser. No. 61/944,587, filed on Feb. 26, 2014 and China application serial no. 201510039055.8, filed on Jan. 27, 2015. The entirety of each of the above-mentioned patent applications is hereby incorporated by reference herein and made a part of this specification.

BACKGROUND OF THE INVENTION

1. Field of the Invention

The invention relates to a power conversion technique, and relates to an inverting apparatus and an AC power system using the same.

2. Description of Related Art

In a general inverting apparatus used in an AC power system (such as a photovoltaic grid system, a wind power grid system, an uninterruptible power supply, or a back-up power system), often only effective power output can be provided, and ineffective power output compensation cannot be provided at the same time. Therefore, when the reactive power generated by the inverting apparatus is increased, the AC output voltage is increased as a result, such that crashing readily occurs to the inverting apparatus. As a result, the DC input power cannot be effectively converted into AC power for power supply, thus causing energy waste.

In current techniques, the inverting apparatus is provided with a sampling circuit of the AC output voltage so as to detect whether abnormality occurs to the AC output voltage. However, in all of the current inverting apparatuses, after the sampling circuit samples the voltage value of the AC output voltage, the voltage value needs to be outputted to a microprocessor in the inverting apparatus to perform a complex operation, such that the microprocessor can determine whether an overvoltage or undervoltage situation occurs to the AC output voltage. In other words, the microprocessor cannot instantly detect abnormality occurs to the AC output voltage. Moreover, since general sampling circuit designs are all too complex, the overall circuit design costs of the inverting apparatus are increased.

SUMMARY OF THE INVENTION

The invention provides an inverting apparatus and an AC power system using the same capable of achieving the detection and protection of an AC output voltage via a simple circuit configuration.

An inverting apparatus of the invention includes an inverting circuit, a detecting circuit, and a control circuit. The inverting circuit receives a DC input voltage and is configured to convert the DC input voltage into an AC output voltage. The detection circuit is coupled to the inverting circuit and is configured to sample the AC output voltage, wherein the detection circuit compares the sampled AC output voltage respectively with a first reference voltage and a second reference voltage so as to generate a first indication signal and a second indication signal. The control circuit is coupled to the inverting circuit and the detection circuit and is configured to control the operation of the inverting circuit, wherein the control circuit determines whether the amplitude of the AC output voltage is located within an operating voltage range during each driving cycles according to the first indication signal and the second indication signal, and decides whether to enable an overvoltage protection or an undervoltage protection to control the power conversion of the inverting circuit according to the determination results.

In an embodiment of the invention, when the control circuit determines the amplitude of the AC output voltage is greater than both the first reference voltage and the second reference voltage according to the first indication signal and the second indication signal, the control circuit enables the overvoltage protection to control the power conversion of the inverting circuit, and when the control circuit determines the amplitude of the AC output voltage is less than both the first reference voltage and the second reference voltage according to the first indication signal and the second indication signal, the control circuit enables the undervoltage protection to control the power conversion of the inverting circuit.

In an embodiment of the invention, the detection circuit includes an amplitude adjustment unit, a reference voltage generation unit, a first comparing unit, and a second comparing unit. The amplitude adjustment unit receives the AC output voltage and adjusts the amplitude of the AC output voltage according to a gain adjustment ratio, so as to generate a sampling voltage related to the AC output voltage. The reference voltage generation unit is configured to generate the first reference voltage and the second reference voltage. The first input terminal of the first comparing unit is coupled to the amplitude adjustment unit to receive the sampling voltage, the second input terminal of the first comparing unit is coupled to the reference voltage generation unit to receive the first reference voltage, and the output terminal of the first comparing unit outputs the first indication signal. The first input terminal of the second comparing unit is coupled to the amplitude adjustment unit to receive the sampling voltage, the second input terminal of the second comparing unit is coupled to the reference voltage generation unit to receive the second reference voltage, and the output terminal of the second comparing unit outputs the second indication signal.

In an embodiment of the invention, the control circuit includes an AC voltage protection unit, a high-voltage detection unit, a low-voltage detection unit, and a drive controller. The AC voltage protection unit is configured to generate an overvoltage protection signal and an undervoltage protection signal according to the first indication signal and the second indication signal. The high-voltage detection unit is coupled to the AC voltage protection unit and receives the first indication signal, wherein the high-voltage detection unit decides whether to provide the first indication signal to the AC voltage protection unit according to a sampling control signal. The low-voltage detection unit is coupled to the AC voltage protection unit and receives the second indication signal, wherein the low-voltage detection unit decides whether to provide the second indication signal to the AC voltage protection unit according to the sampling control signal. The drive controller is coupled to the inverting circuit and the AC voltage protection unit and is configured to generate a drive control signal to control the operation of the inverting circuit, wherein the drive controller adjusts the drive control signal according to the overvoltage protection signal, so as to execute the overvoltage protection, and adjusts the drive control signal according to the undervoltage protection signal so as to execute the undervoltage protection.

In an embodiment of the invention, the control circuit further includes an enabling unit. The enabling unit is coupled to the high-voltage detection unit and the low-voltage detection unit and is configured to generate the sampling control signal, wherein the enabling unit generates an enabled sampling control signal within a preset period of each of the driving cycles, so as to make the high-voltage detection unit and the low-voltage detection unit respond to the enabling sampling control signal to respectively provide the first indication signal and the second indication signal to the AC voltage protection unit.

An AC power system of the invention includes a DC power generation apparatus and an inverting apparatus. The DC power generation apparatus is configured to generate a DC input voltage. The inverting apparatus is coupled to the DC power generation apparatus, wherein the inverting apparatus includes an inverting circuit, a detection circuit, and a control circuit. The inverting circuit receives a DC input voltage and is configured to convert the DC input voltage into an AC output voltage. The detection circuit is coupled to the inverting circuit and is configured to sample the AC output voltage, wherein the detection circuit performs comparison with the sampled AC output voltage respectively via a first reference voltage and a second reference voltage so as to generate a first indication signal and a second indication signal. The control circuit is coupled to the inverting circuit and the detection circuit and is configured to control the operation of the inverting circuit, wherein the control circuit determines whether the amplitude of the AC output voltage is located within an operating voltage range within every driving cycle according to the first indication signal and the second indication signal, and decides whether to enable an overvoltage protection or an undervoltage protection to control the power conversion of the inverting circuit according to the determination results.

Based on the above, the embodiments of the invention provide an inverting apparatus and an AC power system using the same. The inverting apparatus can compare the amplitude of the AC output voltage and the reference voltage to generate a plurality of indication signals according to the comparison results, and then determine whether an overvoltage or undervoltage situation occurs to the AC output voltage at present according to the logical combination of the generated indication signals. As a result, the inverting apparatus of an embodiment of the invention does not need to perform a complex operation and can rapidly determine whether abnormality occurs to the AC output voltage. Moreover, the indication signals capable of indicating the amplitude of the AC output voltage can be implemented via a relatively simple circuit architecture composed of comparators, and therefore additional burden does not occur to overall circuit design costs.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
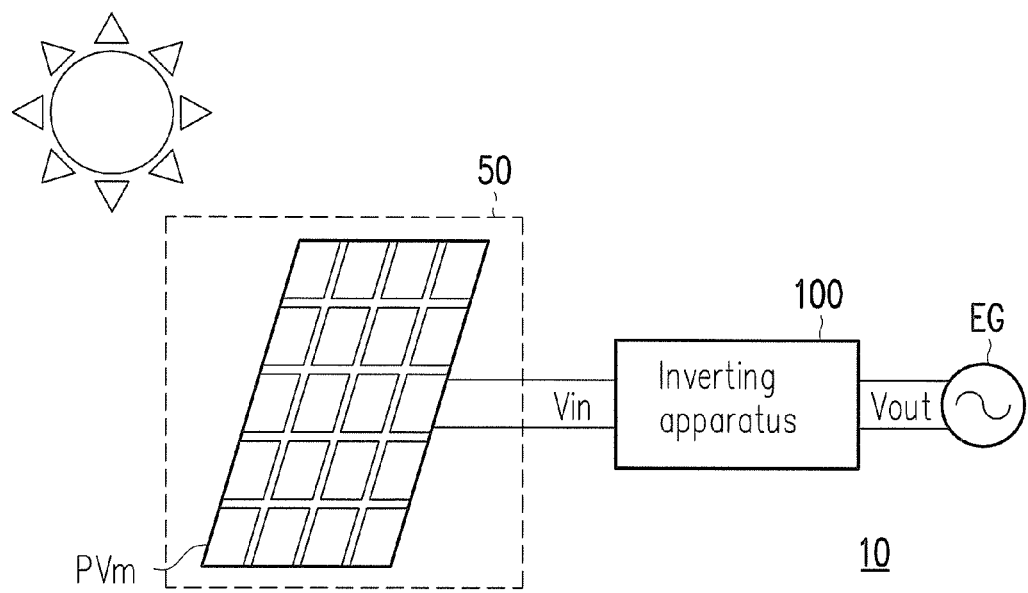
FIG. 1 is a schematic of an AC power system of an embodiment of the invention.

To make the contents of the invention more easily understood, embodiments are provided below as examples of the plausibility of implementation of the invention. Moreover, when applicable, devices/components/steps having the same reference numerals in figures and embodiments represent the same or similar parts.

FIG. 1 is a schematic of an AC power system of an embodiment of the invention. Referring to FIG. 1, in the present embodiment, an AC power system 10 includes a DC power generation apparatus 50 and an inverting apparatus 100. Accordingly, the AC power system 10 is exemplified by a photovoltaic grid system, and therefore the DC power generation apparatus 50 can be, for instance, a photovoltaic module PVm (but not limited thereto). The photovoltaic module PVm can be configured to convert solar energy into a DC input voltage Vin in electricity energy form. It should be mentioned that, the AC power system 10 is not only limited to a photovoltaic grid system, and can also be a wind power grid system or other renewable energy grid systems, or a non-grid system such as an uninterruptible power supply (UPS) or a back-up power system (BPS).

The inverting apparatus 100 receives the DC input voltage Vin outputted by the DC power generation apparatus 50 and accordingly generates an AC output voltage Vout to a power grid EG connected in the back-end. In particular, the inverting apparatus 100 can rapidly detect whether the AC output voltage Vout outputted to the power grid EG is abnormal via a simple circuit architecture, so as to instantly enable a protection mechanism to adjust the operation of the inverting apparatus 100.

The specific architecture of the inverting apparatus 100 of an embodiment of the invention is described below with reference to FIG. 2. In particular, FIG. 2 is a schematic of an inverting apparatus of an embodiment of the invention.

Figure 2:
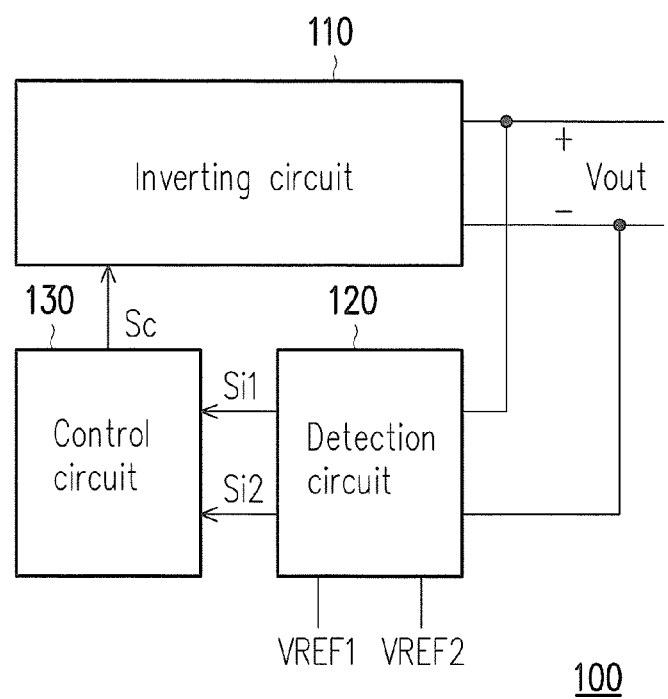
FIG. 2 is a schematic of an inverting apparatus of an embodiment of the invention.

Referring to both FIG. 1 and FIG. 2, the inverting apparatus 100 of the present embodiment includes an inverting circuit 110, a detection circuit 120, and a control circuit 130. The inverting circuit 110 receives the DC input voltage Vin from the DC power generation apparatus 50 and is configured to convert the DC input voltage Vin into an AC output voltage Vout. In particular, the circuit configuration of the inverting circuit 110 can be, for instance, half-bridge asymmetric, half-bridge symmetric, full-bridge, or other possible inverting circuit configurations, and the invention does not particularly limit the circuit configuration of the inverting circuit 110.

The detection circuit 120 is coupled to the inverting circuit 110 and is configured to sample the AC output voltage Vout. In the present embodiment, the detection circuit 120 compares the sampled AC output voltage Vout respectively with a first reference voltage VREF1 and a second reference voltage VREF2 so as to generate a first indication signal Si1 and a second indication signal Si2.

The control circuit 130 is coupled to the inverting circuit 110 and the detection circuit 120 and is configured to provide a drive control signal Sc to control the power conversion operation of the inverting circuit 110, and the drive control signal Sc can be, for instance, a PWM signal for controlling the switching cycle of the inverting circuit 110, but the invention is not limited thereto.

In the present embodiment, the control circuit 130 receives the first indication signal Si1 and the second indication signal Si2 generated by the detection circuit 120, and determines whether the amplitude of the AC output voltage Vout is located within an operating voltage range during each driving cycles according to the first indication signal Si1 and the second indication signal Si2, and then decides whether to enable an overvoltage protection or an undervoltage protection according to the determination results to control the power conversion of the inverting circuit 110, such that the AC output voltage Vout return to the normal operating voltage range, or stop the operation of the inverting circuit 110.

Specifically, the operating voltage range is defined according to the set first reference voltage VREF1 and second reference voltage VREF2. In the present embodiment, when the control circuit 130 determines the amplitude of the AC output voltage Vout is greater than both the first reference voltage VREF1 and the second reference voltage VREF2 according to the first indication signal Si1 and the second indication signal Si2, the control circuit 130 determines an overvoltage situation occurs to the inverting circuit 110 at this point according to the first indication signal Si1 and the second indication signal Si2, and therefore the control circuit 130 enables the overvoltage protection at this point to control the power conversion of the inverting circuit 110. For instance, the control circuit 130 can suspend outputting the drive control signal Sc when the control circuit 130 determines overvoltage occurs to the inverting circuit 110 until the amplitude of the AC output voltage Vout returns to the operating voltage range, and then the control circuit 130 resumes normal output of the drive control signal Sc.

Moreover, when the control circuit 130 determines the amplitude of the AC output voltage Vout is less than both the first reference voltage VREF1 and the second reference voltage VREF2 according to the first indication signal Si1 and the second indication signal Si2, the control circuit 130 determines an undervoltage situation occurs to the inverting circuit 110 at this point according to the first indication signal Si1 and the second indication signal Si2, and therefore the control circuit 130 enables the undervoltage protection at this point to control the power conversion of the inverting circuit 110. For instance, the control circuit 130 can reduce the frequency and the duty cycle of the drive control signal Sc when the control circuit 130 determines undervoltage occurs to the inverting circuit 110, so as to restrict the output power of the inverting circuit 110 until the amplitude of the AC output voltage Vout returns to the operating voltage range, and then the control circuit 130 resumes normal output of the drive control signal Sc.

In comparison to the traditional inverting apparatus requiring a control circuit to calculate whether overvoltage or undervoltage occurs according to the AC output voltage, the control circuit 130 of an embodiment of the invention can determine whether an overvoltage or undervoltage situation occurs to the AC output voltage Vout at present simply according to the logical combination of the first indication signal Si1 and the second indication signal Si2. As a result, the control circuit 130 of an embodiment of the invention does not need to perform a complex operation/calculation and can rapidly determine whether abnormality occurs to the AC output voltage Vout. Moreover, the detection circuit 120 of an embodiment of the invention can achieve amplitude indication of the AC output voltage Vout via a relatively simple circuit architecture composed of comparators, and therefore additional burden does not occur to overall circuit design costs.

Figure 3:
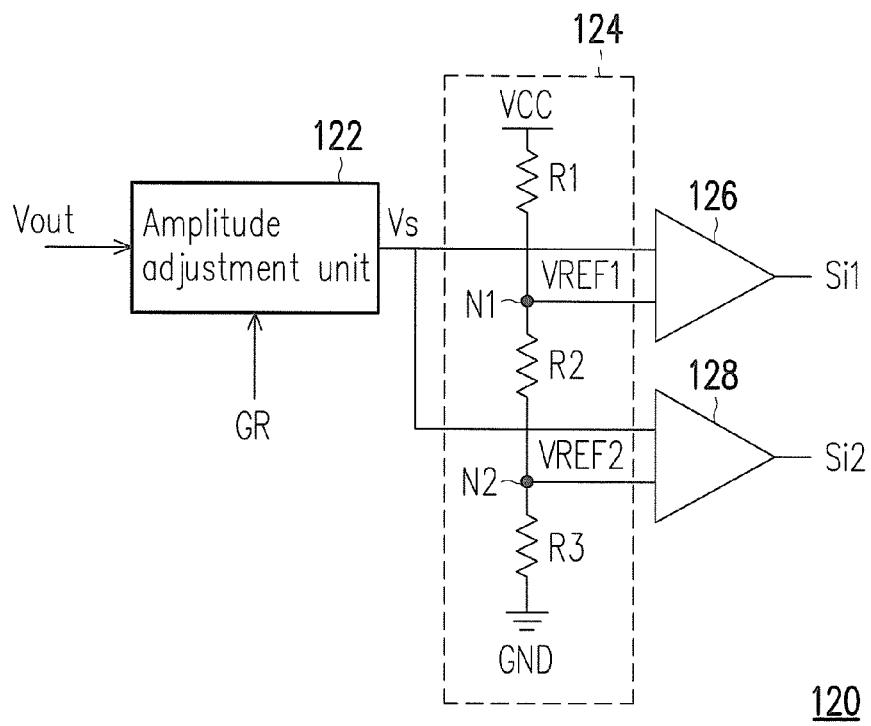
FIG. 3 is a schematic of a detection circuit of an embodiment of the invention.
Figure 4:
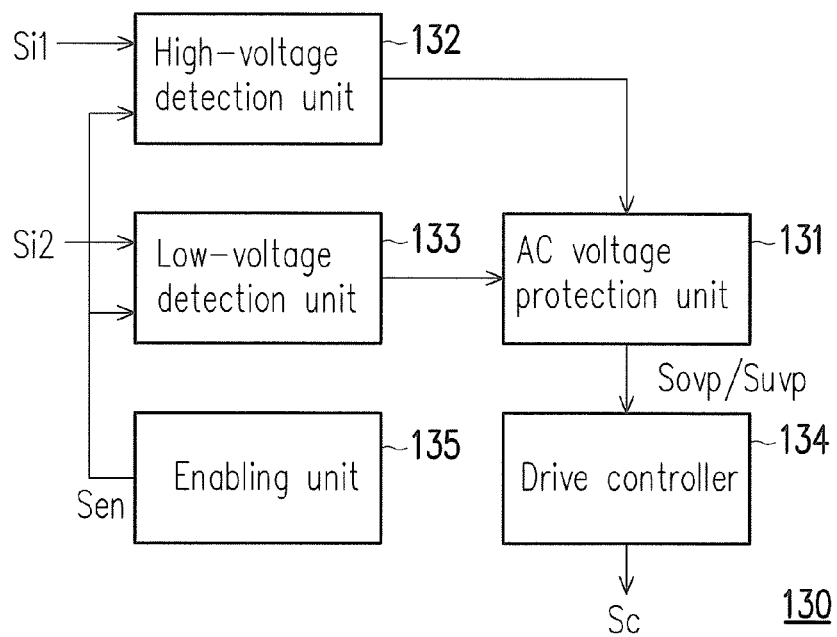
FIG. 4 is a schematic of a control circuit of an embodiment of the invention.

The architectures of the detection circuit 120 and the control circuit 130 of an embodiment of the invention are described with reference to FIG. 3 and FIG. 4 below. In particular, FIG. 3 is a schematic of a detection circuit of an embodiment of the invention. FIG. 4 is a schematic of a control circuit of an embodiment of the invention.

Referring first to FIG. 3, in the present embodiment, the detection circuit 120 includes an amplitude adjustment unit 122, a reference voltage generation unit 124, a first comparing unit 126, and a second comparing unit 128. The amplitude adjustment unit 122 receives the AC output voltage Vout and adjusts the amplitude of the AC output voltage Vout according to a gain adjustment ratio GR, so as to generate a sampling voltage Vs related to the AC output voltage Vout. In particular, the AC output voltage Vout and the sampling voltage Vs are, for instance, multiples of each other, and the magnitude thereof is decided by the gain adjustment ratio GR. For instance, the amplitude adjustment unit 122 can generate the sampling voltage Vs for which the amplitude is half of the AC output voltage Vout according to the gain adjustment ratio GR, but the invention is not limited thereto.

The reference voltage generation unit 124 is configured to generate the first reference voltage VREF1 and the second reference voltage VREF2. In particular, the reference voltage generation unit 124 can be implemented by, for instance, resistors R1, R2, and R3 connected to one another in series. More specifically, the resistors R1 to R3 are a resistor string coupled between a power voltage VCC (such as a DC voltage generated according to the AC output voltage Vout) and a ground terminal GND. Voltage division is performed on the power voltage VCC via the resistors R1 to R3, and the first reference voltage VREF1 and the second reference voltage VREF2 can be respectively built on nodes N1 and N2. In other words, the sizes of the first reference voltage VREF1 and the second reference voltage VREF2 can be changed according to the resistance value settings of the resistors R1 to R3, and the first reference voltage VREF1 is greater than the second reference voltage VREF2.

The first input terminal (such as the positive input terminal) of the first comparing unit 126 is coupled to the amplitude adjustment unit 122 to receive the sampling voltage Vs. The second input terminal (such as the negative input terminal) of the first comparing unit 126 is coupled to the node N1 of the reference voltage generation unit 124 to receive the first reference voltage VREF1. The output terminal of the first comparing unit 126 outputs the first indication signal Si1 according to the comparison results of the sampling voltage Vs and the first reference voltage VREF1. For instance, when the voltage swing of the sampling voltage Vs at a particular time point is greater than the first reference voltage VREF1, the first comparing unit 126 generates an enabled first indication signal Si1 (such as logic 1). On the contrary, when the voltage swing of the sampling voltage Vs at a particular time point is less than the first reference voltage VREF1, the first comparing unit 126 generates a disabled first indication signal Si1 (such as logic 0).

The first input terminal (such as the positive input terminal) of the second comparing unit 128 is coupled to the amplitude adjustment unit 126 to receive the sampling voltage Vs. The second input terminal (such as the negative input terminal) of the second comparing unit 128 is coupled to the node N2 of the reference voltage generation unit 124 to receive the second reference voltage VREF2. The output terminal of the second comparing unit 128 outputs the second indication signal Si2 according to the comparison results of the sampling voltage Vs and the second reference voltage VREF2. For instance, when the voltage swing of the sampling voltage Vs at a particular time point is greater than the second reference voltage VREF2, the second comparing unit 128 generates an enabled second indication signal Si2 (such as logic 1). On the contrary, when the voltage swing of the sampling voltage Vs at a particular time point is less than the second reference voltage VREF2, the second comparing unit 128 generates a disabled second indication signal Si2 (such as logic 0).

Referring next to FIG. 4, in the present embodiment, the control circuit 130 includes an AC voltage protection unit 131, a high-voltage detection unit 132, a low-voltage detection unit 133, a drive controller 134, and an enabled unit 135. The AC voltage protection unit 131 is configured to generate an overvoltage protection signal Sovp and an undervoltage protection signal Suvp according to the first indication signal Si1 and the second indication signal Si2. In particular, the logical combination of the first indication signal Si1 and the second indication signal Si2 and the representing detection results are as shown in the following Table 1:

TABLE 1

| | | | |
|---|---|---|---|
| First indication signal | 1 | 0 | 0 |
| Second indication signal | 1 | 1 | 0 |
| Detection results | Overvoltage occurs | Normal operation | Undervoltage occurs |

When the AC voltage protection unit 131 receives the first indication signal Si1 and the second indication signal Si2 that are both enabled/logic 1, the AC voltage protection unit 131 determines overvoltage occurs to the inverting circuit 110 and generates an overvoltage protection signal Sovp. Moreover, when the AC voltage protection unit 131 receives the first indication signal Si1 and the second indication signal Si2 that are both disabled/logic 0, the AC voltage protection unit 131 determines undervoltage occurs to the inverting circuit 110 and generates an undervoltage protection signal Suvp. Moreover, if the first indication signal Si1 and the second indication signal Si2 received by the AC voltage protection unit 131 are respectively enabled/logic 1 and disabled/logic 0, then the AC output voltage Vout is located within a normal operating voltage range, and therefore the overvoltage protection signal Sovp/undervoltage protection signal Suvp indicating overvoltage or undervoltage is not generated.

The high-voltage detection unit 132 is coupled to the AC voltage protection unit 131 and receives the first indication signal Si1. The high-voltage detection unit 132 decides whether to provide the first indication signal Si1 to the AC voltage protection unit 131 according to a received sampling control signal Sen (sent by the enabling unit 135). The low-voltage detection unit 133 is coupled to the AC voltage protection unit 131 and receives the second indication signal Si2. The low-voltage detection unit 132 similarly decides whether to provide the second indication signal Si2 to the AC voltage protection unit 131 according to the received sampling control signal Sen.

Specifically, the enabling unit 135 is coupled to the high-voltage detection unit 132 and the low-voltage detection unit 133 so as to generate the sampling control signal Sen and provide the sampling control signal Sen to the high-voltage detection unit 132 and the low-voltage detection unit 133. In particular, the enabling unit 135 generates the enabled sampling control signal Sen during a preset period of each driving cycles, such that the high-voltage detection unit 132 and the low-voltage detection unit 133 respectively provide the first indication signal Si1 and the second indication signal Si2, in response to the enabled sampling control signal Sen, to the AC voltage protection unit 131. For instance, the preset period can be a period for which the phase of the AC output voltage Vout/sampling voltage Vs is 0 degrees to 180 degrees (i.e., period of positive half-cycle), or a period for which the phase of the AC output voltage Vout/sampling voltage Vs is 80 degrees to 100 degrees (i.e., period in which the amplitude approaches the peak). In this way, the possibility of misjudgment of the AC voltage protection unit 131 due to voltage noise can be prevented. It should be mentioned that, the setting terminal of the preset period is decided by the designer's needs, and the invention is not limited thereto.

The drive controller 134 is coupled to the inverting circuit 110 and the AC voltage protection unit 131. The drive controller 134 is configured to generate the drive control signal Sc to control the operation of the inverting circuit 110, wherein the drive controller 134 adjusts the drive control signal Sc according to the overvoltage protection signal Sovp, so as to execute the overvoltage protection (such as reducing the frequency and/or duty cycle of the drive control signal Sc). Moreover, the drive controller 134 further adjusts the drive control signal Sc according to the undervoltage protection signal Suvp, so as to execute the undervoltage protection (such as stopping to provide the drive control signal Sc).

Based on the above, the embodiments of the invention provide an inverting apparatus and an AC power system using the same. The inverting apparatus is capable of comparing the amplitudes of the AC output voltage and the reference voltage to generate a plurality of indication signals according to the comparison results, and then determine whether an overvoltage or undervoltage situation occurs to the AC output voltage at present according to the logical combination of the generated indication signals. As a result, the inverting apparatus of an embodiment of the invention does not need to perform a complex operation and can rapidly determine whether abnormality occurs to the AC output voltage. Moreover, the indication signals capable of indicating the amplitude of the AC output voltage can be implemented via a relatively simple circuit architecture composed of comparators, and therefore additional burden does not occur to overall circuit design costs.

Lastly, it should be mentioned that: each of the above embodiments is only configured to describe the technical solutions of the invention and is not intended to limit the invention; and although the invention is described in detail via each of the above embodiments, those having ordinary skill in the art should understand that: modifications can still be made to the technical solutions recited in each of the above embodiments, or portions or all of the technical features thereof can be replaced to achieve the same or similar results; the modifications or replacements do not make the nature of corresponding technical solutions depart from the scope of the technical solutions of each of the embodiments of the invention.

What is claimed is:

1. An inverting apparatus, comprising:
an inverting circuit receiving a DC input voltage and configured to convert the DC input voltage into an AC output voltage;
a detection circuit coupled to the inverting circuit and configured to sample the AC output voltage, wherein the detection circuit compares the sampled AC output voltage respectively with a first reference voltage and a second reference voltage so as to generate a first indication signal and a second indication signal; and
a control circuit coupled to the inverting circuit and the detection circuit and configured to control an operation of the inverting circuit, wherein the control circuit determines whether an amplitude of the AC output voltage is located within an operating voltage range during each driving cycles according to the first indication signal and the second indication signal, and decides whether to enable an overvoltage protection or an undervoltage protection to control a power conversion of the inverting circuit according to the determination results.

2. The inverting apparatus of claim 1, wherein when the control circuit determines an amplitude of the AC output voltage is greater than both the first reference voltage and the second reference voltage according to the first indication signal and the second indication signal, the control circuit enables the overvoltage protection to control the power conversion of the inverting circuit, and when the control circuit determines the amplitude of the AC output voltage is less than both the first reference voltage and the second reference voltage according to the first indication signal and the second indication signal, the control circuit enables the undervoltage protection to control the power conversion of the inverting circuit.

3. The inverting apparatus of claim 1, wherein the detection circuit comprises:
an amplitude adjustment unit receiving the AC output voltage and adjusting an amplitude of the AC output voltage according to a gain adjustment ratio, so as to generate a sampling voltage related to the AC output voltage;
a reference voltage generation unit configured to generate the first reference voltage and the second reference voltage;
a first comparing unit, having a first input terminal coupled to the amplitude adjustment unit to receive the sampling voltage, a second input terminal coupled to the reference voltage generation unit to receive the first reference voltage, and an output terminal outputting the first indication signal; and
a second comparing unit, having a first input terminal coupled to the amplitude adjustment unit to receive the sampling voltage, a second input terminal coupled to the reference voltage generation unit to receive the second reference voltage, and an output terminal outputting the second indication signal.

4. The inverting apparatus of claim 1, wherein the control circuit comprises:
an AC voltage protection unit configured to generate an overvoltage protection signal and an undervoltage protection signal according to the first indication signal and the second indication signal;
a high-voltage detection unit coupled to the AC voltage protection unit and receiving the first indication signal, wherein the high-voltage detection unit decides whether to provide the first indication signal to the AC voltage protection unit according to a sampling control signal;
a low-voltage detection unit coupled to the AC voltage protection unit and receiving the second indication signal, wherein the low-voltage detection unit decides whether to provide the second indication signal to the AC voltage protection unit according to the sampling control signal; and
a drive controller coupled to the inverting circuit and the AC voltage protection unit and configured to generate a drive control signal to control the operation of the inverting circuit, wherein the drive controller adjusts the drive control signal according to the overvoltage protection signal so as to execute the overvoltage protection, and adjusts the drive control signal according to the undervoltage protection signal so as to execute the undervoltage protection.

5. The inverting apparatus of claim 4, wherein the control circuit further comprises:
an enabling unit coupled to the high-voltage detection unit and the low-voltage detection unit and configured to generate the sampling control signal, wherein the enabling unit generates an enabled sampling control signal during a preset period of each of the driving cycles, such that the high-voltage detection unit and the low-voltage detection unit respectively provide the first indication signal and the second indication signal to the AC voltage protection unit in response to the enabled sampling control signal.

6. An AC power system, comprising:
a DC power generation apparatus configured to generate a DC input voltage; and
an inverting apparatus coupled to the DC power generation apparatus, wherein the inverting apparatus comprises:
an inverting circuit receiving the DC input voltage and configured to convert the DC input voltage into an AC output voltage;
a detection circuit coupled to the inverting circuit and configured to sample the AC output voltage, wherein the detection circuit compares the sampled AC output voltage respectively with a first reference voltage and a second reference voltage so as to generate a first indication signal and a second indication signal; and
a control circuit coupled to the inverting circuit and the detection circuit and configured to control an operation of the inverting circuit, wherein the control circuit determines whether an amplitude of the AC output voltage is located within an operating voltage range during each driving cycles according to the first indication signal and the second indication signal, and decides whether to enable an overvoltage protection or an undervoltage protection to control a power conversion of the inverting circuit according to the determination results.

7. The AC power system of claim 6, wherein when the control circuit determines the amplitude of the AC output voltage is greater than both the first reference voltage and the second reference voltage according to the first indication signal and the second indication signal, the control circuit enables the overvoltage protection to control the power conversion of the inverting circuit, and when the control circuit determines the amplitude of the AC output voltage is less than both the first reference voltage and the second reference voltage according to the first indication signal and the second indication signal, the control circuit enables the undervoltage protection to control the power conversion of the inverting circuit.

8. The AC power system of claim 6, wherein the detection circuit comprises:
- an amplitude adjustment unit receiving the AC output voltage and adjusting an amplitude of the AC output voltage according to a gain adjustment ratio, so as to generate a sampling voltage related to the AC output voltage;
- a reference voltage generation unit configured to generate the first reference voltage and the second reference voltage;
- a first comparing unit, having a first input terminal coupled to the amplitude adjustment unit to receive the sampling voltage, a second input terminal coupled to the reference voltage generation unit to receive the first reference voltage, and an output terminal outputting the first indication signal; and
- a second comparing unit, having a first input terminal coupled to the amplitude adjustment unit to receive the sampling voltage, a second input terminal coupled to the reference voltage generation unit to receive the second reference voltage, and an output terminal outputting the second indication signal.

9. The AC power system of claim 6, wherein the control circuit comprises:
- an AC voltage protection unit configured to generate an overvoltage protection signal and an undervoltage protection signal according to the first indication signal and the second indication signal;
- a high-voltage detection unit coupled to the AC voltage protection unit and receiving the first indication signal, wherein the high-voltage detection unit decides whether to provide the first indication signal to the AC voltage protection unit according to a sampling control signal;
- a low-voltage detection unit coupled to the AC voltage protection unit and receiving the second indication signal, wherein the low-voltage detection unit decides whether to provide the second indication signal to the AC voltage protection unit according to the sampling control signal; and
- a drive controller coupled to the inverting circuit and the AC voltage protection unit and configured to generate a drive control signal to control the operation of the inverting circuit, wherein the drive controller adjusts the drive control signal according to the overvoltage protection signal, so as to execute the overvoltage protection, and adjusts the drive control signal according to the undervoltage protection signal so as to execute the undervoltage protection.

10. The AC power system of claim 9, wherein the control circuit further comprises:
- an enabling unit coupled to the high-voltage detection unit and the low-voltage detection unit and configured to generate the sampling control signal, wherein the enabling unit generates an enabled sampling control signal during a preset period of each of the driving cycles, such that the high-voltage detection unit and the low-voltage detection unit respectively provide the first indication signal and the second indication signal to the AC voltage protection unit in response to the enabled sampling control signal.

* * * * *